July 25, 1939.  C. P. HEGAN  2,167,323

FILTERING MEDIUM FOR AIR FILTERS

Original Filed June 30, 1926

Patented July 25, 1939

2,167,323

UNITED STATES PATENT OFFICE 2,167,323

FILTERING MEDIUM FOR AIR FILTERS

Chester P. Hegan, Louisville, Ky., assignor to American Air Filter Company, Inc., Louisville, Ky., a corporation of Delaware Application June 30, 1926, Serial No. 119,521
Renewed March 20, 1936

2 Claims. (Cl. 183—45)

This invention relates to air filters and pertains more particularly to improvements in the filtering medium.

It is an object of this invention to provide a filtering medium which shall present to the air to be filtered a tangled mass having a large number of separate strands presenting surfaces against which dust particles and other foreign matter which it is desired to remove from the air may impinge, said strands being so arranged as to cause the air currents passing through the filter to be repeatedly split and deflected in order to secure maximum cleansing or filtering, and in which the surfaces of the individual strands shall be substantially smooth in order that the collected dust and dirt may be easily removed therefrom in cleaning.

Other objects and advantages of the invention will appear hereinafter.

Figure 1:
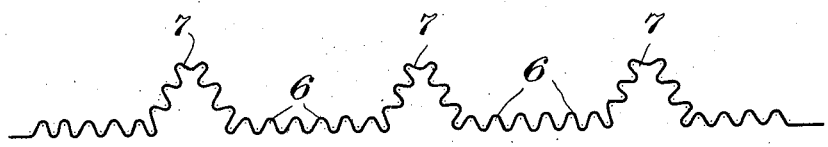
Figure 2:
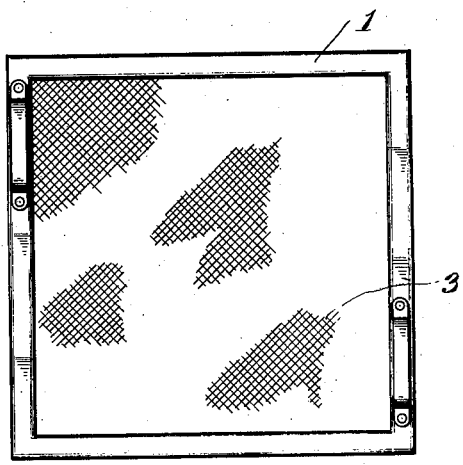
Figure 3:
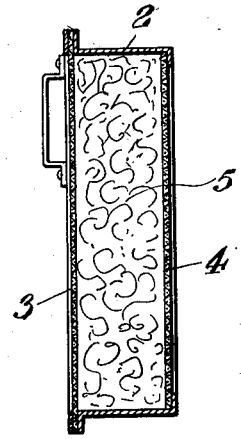

A preferred embodiment of the invention selected for purposes of illustration is shown in the accompanying drawing, in which, Figure 1 shows a single strand of the filtering media, Figure 2 is a front elevation of a filter cell in which the filter media is adapted to be contained, and Figure 3 is a section.

Referring to the drawing, the filter cell 1 which is illustrated is of a standard type and consists of a framework 2 having screens 3 and 4 preferably of expanded metal covering its intake and discharge faces respectively. The interior of the cell between said screens provides a space 5 adapted to be packed with the filtering medium about to be described.

Figure 1 illustrates a single strand of the filtering medium which may be conveniently prepared by passing wire of suitable thickness through crimping rolls which bend the wire to provide the small corrugations 6 therein. After this initial treatment, the wire is again passed through crimping rolls having larger teeth spaced further apart than the teeth of the previous crimping rolls so that the larger corrugations 7 are superposed upon the smaller corrugations 6. After leaving the crimping rolls the wire is collected and bunched into wads of a shape and size suitable for packing within the filter cell. As will be observed, the crimping operation provides sufficient kinks and turns in the wire so that when wadded together a very tangled mass is presented to the air passing through the filters. On the other hand, corrugations 6 and 7 prevent the wire from being so closely compacted that unduly high resistance is offered to air passing through the cell.

If desired, after packing the filter units, the fibrous mass may be suitably protected against corrosion and may be bonded together to prevent shifting or matting in the manner described in Hegan Patent No. 1,515,949 of November 18, 1924. If desired, this treatment may be such as to increase the density of the fibers at the discharge side of the filter as described in the aforementioned patent.

It will be observed, however, that the wire forming the filtering media is not cut or shaved in any manner and the outer surface, therefore, is smooth and regular. Accordingly, in cleaning the filters in the customary manner by the application of hot water or steam, any dust or lint which is collected on the individual strands is easily removed.

Furthermore, it may be noted that wads of sufficient size to completely fill a filter cell may be formed of a single continuous strand of wire, or, if desired, the cell may be filled with a relatively small number of wads, each made from a single continuous strand of wire. In this manner the possibility of short loose strands of the filtering medium being carried out of the filter and into the air duct is eliminated.

It is to be understood that the invention may be variously modified and embodied within the scope of the subjoined claims.

It is to be further understood that the term "corrugated wire in strand form" is intended to denote free strands of wire as distinguished from strands which are woven or knitted together in screen or like form.

I claim as my invention:

1. A filter medium comprising wire preformed along its length with a large number of small deformations and a smaller number of larger deformations, said wire being arranged in a tangled mass.

2. A filter medium comprising wire preformed along its length with a series of small corrugations and a series of large corrugations, said wire being arranged in a tangled mass.

CHESTER P. HEGAN.